(No Model.)
J. M. DAVENPORT & B. F. MITCHELL.
FRUIT GATHERER.
No. 413,710. Patented Oct. 29, 1889.
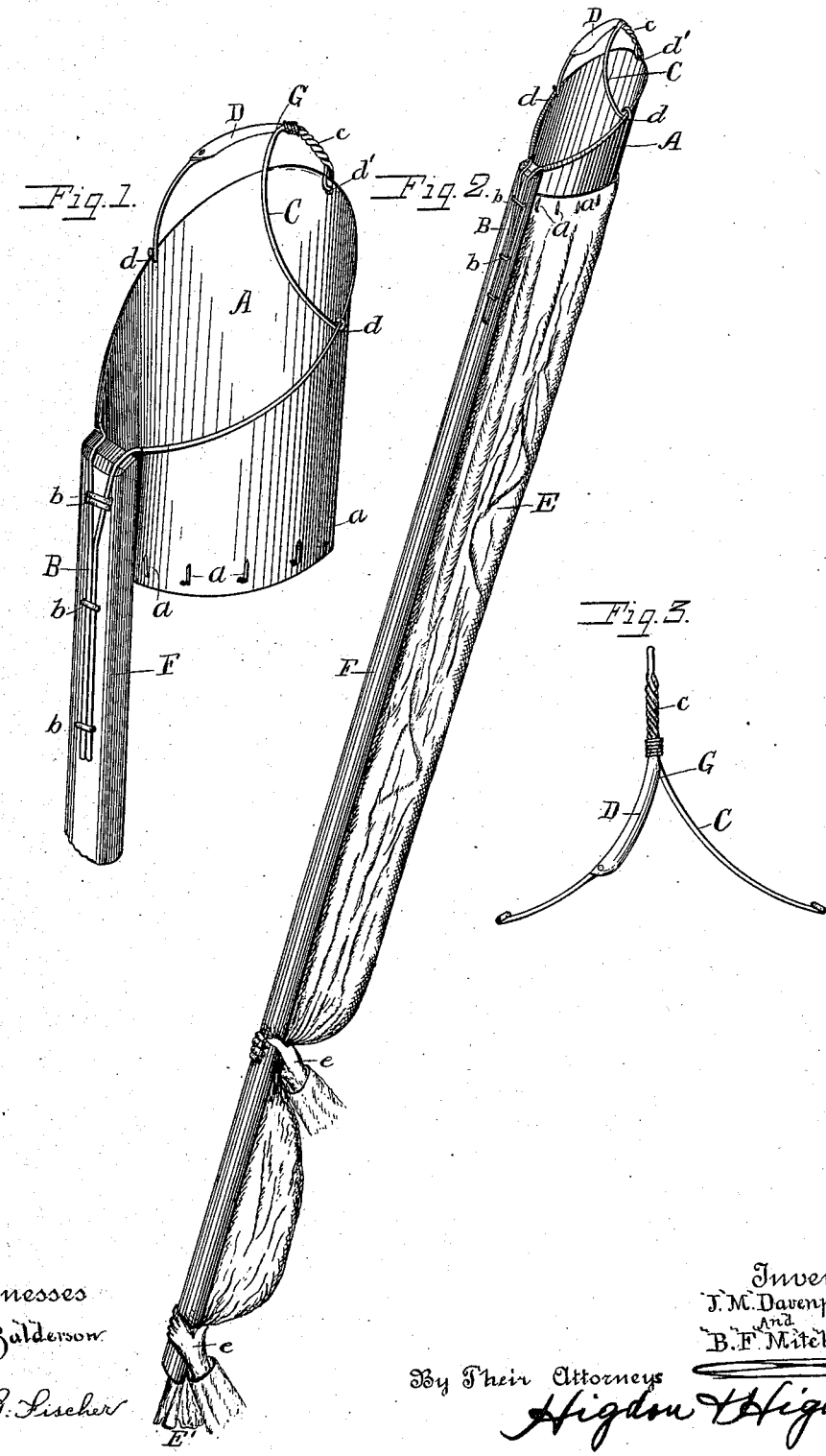
Witnesses
R. A. Balderson
F. G. Fischer
Inventors:
J. M. Davenport
and
B. F. Mitchell
By Their Attorneys
Higdon & Higdon

UNITED STATES PATENT OFFICE.

JAMES M. DAVENPORT AND BENJAMIN F. MITCHELL, OF CENTREVIEW, MISSOURI.

FRUIT-GATHERER.

SPECIFICATION forming part of Letters Patent No. 413,710, dated October 29, 1889.

Application filed July 26, 1889. Serial No. 318,722. (No model.)

*To all whom it may concern:*

Be it known that we, JAMES M. DAVENPORT and BENJAMIN F. MITCHELL, of Centreview, Johnson county, Missouri, have invented certain new and useful Improvements in Fruit-Gatherers, of which the following is a full, clear, and exact description, reference being had to the accompanying drawings, forming a part thereof.

Our invention relates to improvements in fruit-gatherers, the object of which is to provide a cheap and simple device by means of which fruit may be gathered from the tree without the operator leaving the ground.

With the aid of our device fruit of all descriptions may be more quickly gathered without injury to the branches of the trees or bruising the fruit gathered in any way.

In the drawings which illustrate the manner of carrying out our invention, Figure 1 is a detailed perspective view with parts broken away, showing the metallic scoop-shaped head which forms the upper portion of our device. Fig. 2 is a perspective view showing the device complete, and Fig. 3 is a plan view of the frame by means of which the fruit is cut from the tree.

Referring to the drawings by letter, A represents the metallic scoop-shaped head, which is attached to handle F by means of wires B, that extend around the upper edge of the head and pass down through staples b, by means of which they are held in position on said handle. This head is made of sheet metal and has its upper end cut off at an angle. Said upper portion of the scoop-shaped head is provided with two wire bails C, the front ends of which are passed through perforations in the sides of the scoop, as at d. The opposite ends are twisted together, thus forming the third arm c of a triangular cutting-frame, the looped end of which is attached to the head at d'.

D represents a knife-blade or other sharp-edged instrument, which is riveted or otherwise secured to one of the bails C near the point where the latter meet, so that when the gatherer is in position for use the stems of the fruit catching in the crotch of the wire cutting-frame are easily severed.

The lower end of the metallic scoop-shaped head is provided with hooks a, by means of which a bottomless bag or chute E is attached thereto. The lower end of said bag is left open in order that when the bag becomes filled with fruit it can be discharged therefrom by loosening the grasp on the handle and allowing the fruit to pass out. We do this by first releasing the upper hand, which permits the fruit to fall down to the lower hand, which, being near the ground, prevents the fruit from being bruised when discharged from the bag.

Having thus described our invention, what we claim is—

1. In a fruit-gatherer, the handle carrying at its upper end a scoop-shaped head, said head being provided with an upwardly-projecting frame C, formed with three prongs or branches, each of which is secured to the head, and a separate knife or blade attached to one of said prongs or branches, in combination with the chute E, substantially as described.

2. In a fruit-gatherer, the head having an inclined upper end, to which is secured an upwardly-projecting frame of twisted wire formed with three prongs or branches, one of which has a knife or blade riveted thereto, the lower end of said head being provided with hooks adapted to receive a chute E, in combination with a handle F, substantially as described.

In testimony whereof we affix our signatures in presence of two witnesses.

JAMES M. DAVENPORT.
BENJAMIN F. MITCHELL.

Witnesses:
F. G. FISCHER,
A. A. HIGDON.